United States Patent [19]

Cewers et al.

[11] Patent Number: 5,787,924
[45] Date of Patent: Aug. 4, 1998

[54] METHOD FOR CONTROLLING A VALVE AND AN ELECTROMAGNETIC VALVE

[75] Inventors: Goran Cewers, Lund; Goran Skog, Bromma, both of Sweden

[73] Assignee: Siemens Elema AB, Solna, Sweden

[21] Appl. No.: 720,225

[22] Filed: Sep. 26, 1996

[30] Foreign Application Priority Data

Oct. 4, 1995 [SE] Sweden ................................ 9503437

[51] Int. Cl.⁶ ........................................................ F16K 31/12
[52] U.S. Cl. ............................ 137/487.5; 251/129.04; 251/129.01; 251/129.17
[58] Field of Search ................. 251/129.04, 129.17, 251/129.08, 129.01; 137/487.5, 554

[56] References Cited

U.S. PATENT DOCUMENTS

| | | | |
|---|---|---|---|
| 4,690,371 | 9/1987 | Bosley et al. | 251/129.01 |
| 4,694,390 | 9/1987 | Lee | 251/291.01 |
| 5,265,594 | 11/1993 | Olsson et al. | 138/204.18 |
| 5,515,818 | 5/1996 | Born | 251/129.01 |

FOREIGN PATENT DOCUMENTS

| | | |
|---|---|---|
| 0 356 536 | 3/1990 | European Pat. Off. |
| 430 837 | 8/1967 | Switzerland . |
| 2 173 283 | 10/1986 | United Kingdom . |
| WO 94/18681 | 8/1994 | WIPO . |

*Primary Examiner*—Denise L. Ferensic
*Assistant Examiner*—Joanne Y. Kim
*Attorney, Agent, or Firm*—Hill & Simpson

[57] ABSTRACT

In a valve having a mechanically journalled movable element for regulating the valve's degree of opening, and in a method for controlling such a valve, the movable element and journals are made to move in relation to each other in order to reduce friction in the journals of the movable element. The movable element is then in a position governed by the valve's prevailing degree of opening.

20 Claims, 1 Drawing Sheet

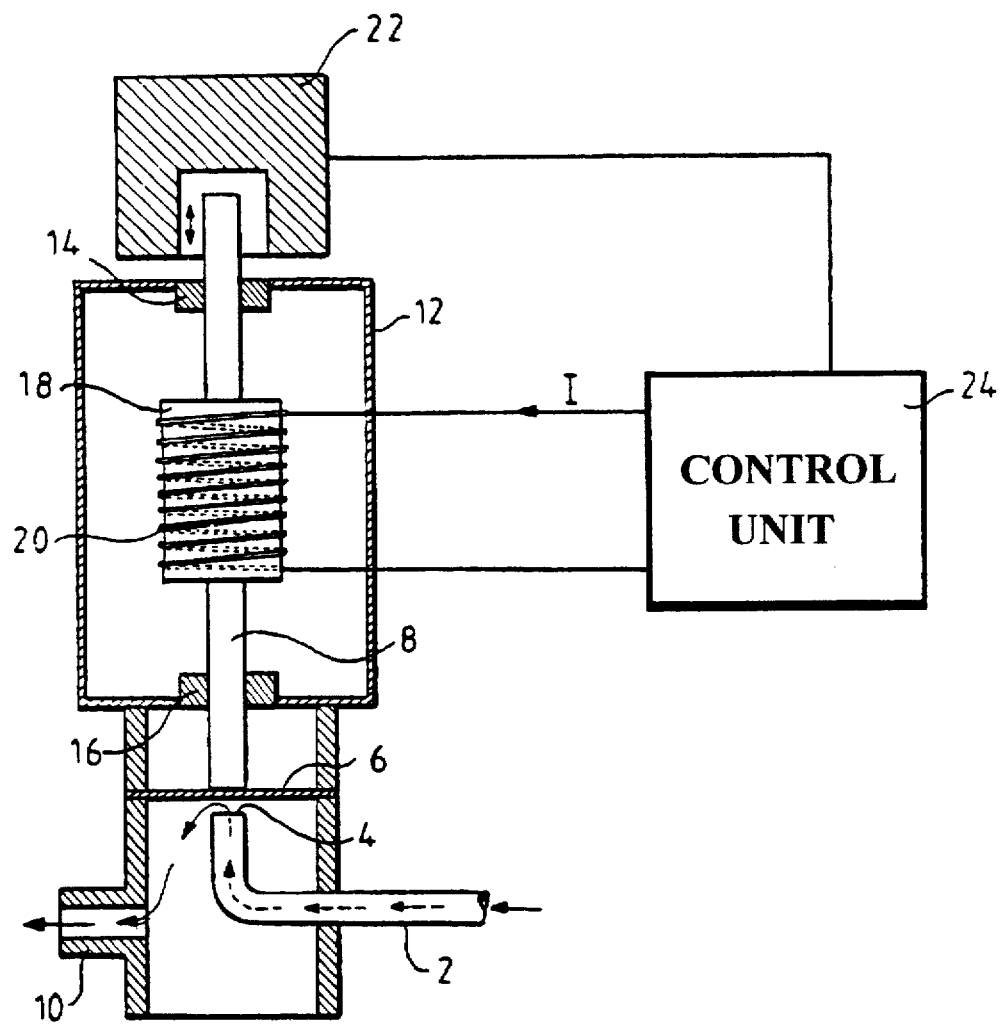

METHOD FOR CONTROLLING A VALVE AND AN ELECTROMAGNETIC VALVE

BACKGROUND OF THE INVENTION

1. Field of the Invention

The present invention relates to a method for controlling a valve having a mechanically journalled movable element for regulating the opening of the valve, the movable element being journalled in a stationary bearing, and to an electromagnetic valve whose degree of opening is adjustable with an element movable in a stationary mechanical bearing.

2. Description of the Prior Art

In a valve having a mechanically journalled movable element which regulates the degree of opening of the valve, friction in the bearing can cause problems. Friction is often unpredictable, since it changes with the age of the valve, the pressure of the movable means against the bearing etc., and friction often causes the movable element to stick in a particular position. This problem is greatest in the regulation of small flows through the valve, a procedure which requires small, precise movements by the movable element. When larger flows are involved, an error in the degree of opening of the movable means is not as critical.

For valves in closed regulatory systems, the aforementioned undesirable effects caused by friction can, in principle, be eliminated by means of feedback regulation. European Application 0 360 809 describes such a feedback valve device for exact regulation of an emitted flow to achieve a flow of the desired magnitude.

There are limits, however, on the degree of amplification permissible in such feedback systems, i.e. in the size of the error signal representing the difference between the desired flow and the true flow, since the system becomes unstable when amplification is too large. These problems in feedback regulatory systems are discussed in Swiss Application 430 837. This document also describes another device for damping oscillations in such a system by the addition of a special stabilization signal to the feedback error signal constituting the difference between the reference signal set and the actual signal.

SUMMARY OF THE INVENTION

An object of the present invention is to eliminate, or at least to reduce, the friction in a movable element used for regulating the opening of a valve.

The above object is achieved in a method according to the invention wherein a valve having a movable element for regulating the opening of the valve is journalled in a stationary journal arrangement, and wherein, in order to reduce the friction of the movable element in the journal arrangement, the movable element is caused to perform a friction reducing movement in an opening position which determines the prevailing degree of opening of the valve.

When the valve's movable element is made to move in relation to its bearing, friction is reduced to a low, well-defined value. This accordingly eliminates the aforementioned problems caused by friction, making precise regulation of even very small flows possible with the valve.

In embodiments of the method according to the invention, the movable element and bearing are made to move back and forth in relation to each other, e.g. in an oscillating, rotary or by movement, via translator.

With a valve, whose degree of opening is varied through a translators movement of the movable means (an example of this type of valve is described in U.S. Pat. No. 5,265,594) the oscillating movement then occurs around the opening position of the movable means, the magnitude of oscillating movement here being so small that fluctuations, caused by variations in the valve's degree of opening, in the flow passing through the valve, are held within acceptable limits. A certain amount of fluctuation, or inaccuracy, in the set flow is normally acceptable, and inaccuracy in the flow caused by the oscillating movement of the movable element, after damping in any connected tube, must lie within permissible limits.

In another advantageous embodiment of the method of the invention, the translator's movement amounts to one percent or less of the maximum translators movement which is possible for varying the valve's degree of opening.

In another embodiment of the method of the invention, the movable element can be made to rotate in the bearing around its own axis of symmetry.

In embodiments of the valve of the invention, the movement-imparting device is arranged to be optionally connectable and disconnectable. It can, e.g., be connected when an error signal, representative of the difference between the desired degree of valve opening and the true degree of valve opening, exceeds a predefined value, or it can be connected when the valve's degree of opening is less than a predefined value, i.e. when sufficiently small values are to be regulated. The movement device can also be arranged so it is disconnected when there are large changes in the valve's opening, i.e. when there are large changes in the set flow. The movement-imparting device can also be arranged to be connected in response to the aforementioned error signal and to impart relative motion, whose magnitude varies with the magnitude of the error signal, to the movable element and bearing. This optional connection and disconnection capability for the movement-imparting device is advantageous, since the movement-imparting device is normally electrically powered and its operation therefore increases power consumption. The movement of the movable means in relation to its bearing can also cause disruptive acoustic effects, however, this disruption can be reduced if the movement-imparting device is only operated periodically.

In other embodiments of the valve of the invention, the movable element is formed by a valve body and/or a driver means for positioning the valve body. The valve body can be a membrane, devised to rebound away from a valve seat and the driver can be a rod, devised to push the membrane to a desired position in relation to the valve seat, overcoming the membrane's own resiliency. The rod can be made at least partially of, or can be coated with a magnetic material, and arranged inside a coil, movable toward or away from the valve seat in order to position the rod and, accordingly, the membrane in relation to the valve seat by controlling the current applied to the coil. Here, the movement-imparting device superimposes a much smaller current on the current to the coil in order cause the rod and, accordingly, the membrane to move around the prevailing degree of opening. Alternately, the rod can be movable in a magnetic field generated by two opposed coaxial coils, the rod and, accordingly, the membrane being movable to a desired position in relation to the valve seat when current to the coils is controlled. Here, the movement-imparting device superimposes a much smaller current on the current to at least one of the coils in order to cause the rod and, accordingly, the membrane to move around the prevailing degree of opening.

In another embodiment of the valve of the invention, the superimposed current is sinusoidal and has a frequency in the 100 to 500 Hz range. The frequency is then less than the upper limit frequency of the electromagnet while simultaneously being high enough for oscillations, arising in the gas flow caused by the movement induced by the superimposed current, to be filtered out in connected tubing.

DESCRIPTION OF THE DRAWINGS

The single figure is a schematic illustration, partly in section, of a valve arrangement constructed and operating in accordance with the principles of the present invention.

DESCRIPTION OF THE PREFERRED EMBODIMENTS

The valve according to the invention has an inlet 2 whose opening 4 can be opened and closed with a membrane 6.

The membrane 6 is elastically resilient. To close the valve, a rod 8 pushes the membrane 6 against the opening 4. To open the valve, the rod 8 retracts, (upward in the drawing), whereupon the membrane 6 rebounds resiliently away from the opening, so a flow can pass through the inlet 2, via the opening 4, and out through the outlet 10. The membrane 6 is devised to rebound resiliently away from the opening 4.

The rod 8 passes through an enclosure 12 and is journalled at journals 14 and 16 for movement along its longitudinal direction. The journals 14 and 16 are made with close tolerances, since they serve as guides for the rod 8.

An armature 18 made of magnetic material is arranged on the rod 8, and this armature 18 is movable inside a coil 20, so the armature 18 and, accordingly, the rod 8,can be moved back and forth in the longitudinal direction of the rod 8 when an appropriate current is applied to the coil 20.

Instead of having a separate armature 18 arranged on the rod, at least a part of the rod 8 itself can be made of a magnetic material which serves as the armature. Alternately, the rod 8 can be at least coated with magnetic material.

For safety reasons, the rod 8 can be spring-loaded to press against the closed position (not shown), so the valve shuts as soon as the current I to the coil 20 is removed.

Instead of having the spring-loaded rod press against the valve's closed position and opening the valve with an electromagnetic force which counteracts the resilient force, the rod 8 can be positioned with opposing magnetic fields from two coaxial coils, the superimposed current then appropriately being applied to one of the coils.

The valve's degree of opening, i.e. the magnitude of the distance between the opening 4, serving as a valve seat, and the membrane 6 can also be adjusted by controlling the current I to the coil 20.

A position sensor 22 can be arranged to sense the position of the valve and is connected to a current control unit 24, so the current I to the coil 20 is regulated at values enabling the rod 8 and, accordingly, the membrane 6 to assume the desired position.

Friction in the journals 14 and 16 often causes the rod to stick. This friction is an unpredictable factor which e.g. changes with the age of the valve, the side of the rod 8 which presses against the journal, etc. When the error signal generated by the position sensor 22 achieves a sufficient magnitude, the current I to the coil 20 is increased, dislodging the rod 8 and causing it to assume a new position. When large flows are regulated, the problems caused by friction are normally negligible, e.g. because errors in the position of the rod 8 and, accordingly, the membrane 6 are small in relation to the valve's total movement. When regulation of small flows is involved, however, friction in the journals 14 and 16 can cause serious problems.

For that reason, a smaller current, preferably a sinusoidal signal, is superimposed on the current I, causing the rod 8 to oscillate around the valve's opening position, and, accordingly, the membrane 6. The current I is governed by the desired degree of valve opening. Since the rod 8 is accordingly kept in motion the whole time, in relation to the journals 14 and 16, the rod is prevented from getting stuck.

The frequency of the superimposed signal is lower than the upper limit frequency of the electromagnet but still high enough for oscillations in flow to be quickly filtered out in the valve tubing normally connected to the outlet 10. A suitable frequency is in the 100 to 500 Hz range.

The amplitude of the superimposed current must be so small that ensuing oscillations in flow always remain within permissible limits. The amplitude of the superimposed current thus should be such that the magnitude of the ensuing movement is on the order of one percent or less of the maximum travel possible for varying the valve's degree of opening.

The superimposed current will increase the electromagnet's power consumption, so the current control unit 24 supplies the superimposed current only when needed, e.g. when the error signal from the position sensor 22 becomes unacceptably large, or when a small reference signal is sent to the electromagnet, i.e. in the regulation of small flows. The disruptions which acoustic effects in the valve can cause when the superimposed current is applied are also reduced accordingly.

Moreover, disconnection of the superimposed current may be appropriate when major changes occur in flow through the valve, i.e. when there are major changes in the position of the rod 8.

The amplitude of the superimposed signal can be constant, or can be governed by the error signal or the reference signal.

One embodiment has been described above in which a oscillating, translatory movement is generated in a rod 8 journalled in journals 14 and 16 with the aid of a superimposed current in the coil 20 to keep the rod 8 from getting stuck in the journals 14 and 16. Alternatively, the valve can be devised so the rod 8, with the aid of the superimposed current, is made to rotate on an axis perpendicular to its longitudinal axis around a mid- position, or the rod 8 can be continuously rotated around its longitudinal axis.

The membrane 6 is appropriately compressible, so the rod 8 is able to perform an oscillating, translatory movement even with the membrane 6 pressed against the valve seat 4. The membrane 6 will then be alternatively compressed and expanded.

Sticking between the valve seat and the valve membrane 6, which can also contribute to the valve becoming stuck in the closed position, can also be reduced by imparting motion to the rod 8 as described above.

One embodiment was described above in which a valve membrane is positioned with a special electromagnetic driver device. Other types of valve bodies, directly positioned by an electromagnet, can also be used.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for controlling a valve having a movable element for regulating a degree of opening of the valve, said movable element being journalled in a stationary journal arrangement, said method comprising the steps of:

positioning said movable element in an opening position determining a degree of opening of the valve which sets a predetermined flow through said valve; and causing said movable element to execute a friction reducing movement in said opening position, having a magnitude maintaining a flow through said valve substantially equal to said predetermined flow.

2. A method as claimed in claim 1 wherein the step of causing said movable element to execute a friction reducing movement comprises executing a back and forth relative movement between said movable element and said journal arrangement.

3. A method as claimed in claim 2 wherein said back and forth movement is a rotation movement.

4. A method as claimed in claim 2 wherein the step of positioning said movable element in said opening position comprises positioning said movable element by a translatory motion, relative to said journal arrangement, into said opening position, and wherein said back and forth movement comprises a translatory motion around said opening position [having a magnitude for causing any fluctuations in a flow passing through said valve to be within a negligible limit].

5. A method as claimed in claim 4 wherein said back and forth translatory movement comprises less than 1 % of a maximum translatory movement which is possible for varying the degree of opening of said valve.

6. A method as claimed in claim 1 wherein said movable element is rotationally symmetrical about an axis of symmetry, and wherein the step of causing said movable element to execute a friction reducing movement comprises rotating said movable element in said journal arrangement around said axis of symmetry.

7. An electromagnetic valve comprising:

a valve opening;

a movable element disposed relative to said valve opening for determining a degree of opening of the valve opening which sets a predetermined flow through said valve;

a stationary mechanical journal arrangement in which said movable element is journalled for movement relative to said valve opening; and control means for moving said movable element to an opening position which determines a degree of opening of said valve opening and for additionally causing said movable element to execute a friction reducing movement relative to said opening position while maintaining a flow through said valve substantially equal to said predetermined flow.

8. An electromagnetic valve as claimed in claim 7 wherein said control means comprises means for moving said movable element in a back and forth movement relative to said journal arrangement as said friction reducing movement.

9. An electromagnetic valve as claimed in claim 8 wherein said back and forth movement comprises less than 1% of a maximum possible movement of said movable element for varying the degree of opening of said valve opening.

10. An electromagnetic valve as claimed in claim 7 further comprising means for selectively connecting and disconnecting said control means.

11. An electromagnetic valve as claimed in claim 10 further comprising:

means for generating an error signal representative of a difference between a desired degree of opening of said valve opening and an actual degree of opening of said valve opening; and said control means comprising means for moving said movable element to said opening position so that said error signal is minimized and means for connecting said means for additionally causing said movable element to execute said friction reducing movement only when said error signal exceeds a predetermined value.

12. An electromagnetic valve as claimed in claim 10 further comprising:

means for generating an error signal representative of a difference between a desired degree of opening of said valve opening and an actual degree of opening of said valve opening; and said control means comprising means for moving said movable element to said opening position so that said error signal is minimized and means for connecting said means for additionally causing said movable element to execute said friction reducing movement comprises means for causing said movable element to execute said friction reducing movement with a magnitude which varies dependent on a magnitude of said error signal.

13. A valve as claimed in claim 10 wherein said means for connecting and disconnecting comprises means for connecting said control means only when a degree of opening of said valve opening is less than a predetermined value.

14. An electromagnetic valve as claimed in claim 10 wherein said means for connecting and disconnecting comprises means for connecting said control means comprises means for connecting said control means only when a change in the degree of opening of said valve opening exceeds a predetermined value.

15. An electromagnetic valve as claimed in claim 7 wherein said movable element comprises a valve body and a drive means for mechanically positioning said valve body.

16. An electromagnetic valve as claimed in claim 15 wherein said valve opening has a valve seat and wherein said valve body comprises a membrane mounted for rebounding away from said valve seat, and wherein said driver means comprises a rod for pushing said membrane to a desired position relative to said valve seat against an inherent resiliency of said membrane, said rod carrying magnetic material, and an electromagnetic coil in which said rod is disposed, and means for controlling current applied to said coil for positioning said rod and said membrane relative to said valve seat dependent on said current, and said means for applying current including means for superimposing a smaller current on said current applied to said coil for causing said rod and said membrane to execute said friction reducing movement.

17. An electromagnetic valve as claimed in claim 16 wherein said smaller current superimposed on said current applied to said coil is sinusoidal and has a frequency in a range of 100 to 500 Hz.

18. An electromagnetic valve as claimed in claim 15 wherein said valve opening has a valve seat and wherein said valve body comprises a membrane and wherein said driver means comprises a rod for pushing said membrane to a desired position relative to said valve seat, said rod carrying magnetic material, and first and second electromagnetic coils respectively generating first and second opposing co-axial magnetic fields in which said rod is disposed, means for applying first and second currents respectively to said first and second coils for causing said rod to move toward or away from said valve seat to set the membrane to said position relative to said valve seat, and means for imposing a smaller current on at least one of said first and second currents for causing said rod and said membrane to execute said friction reducing movement.

19. An electromagnetic valve as claimed in claim 18 wherein said means for superimposing said smaller current comprises means for superimposing a smaller current having a magnitude for causing any fluctuations in a flow passing through said valve opening to be within a negligible limit.

20. An electromagnetic valve as claimed in claim 18 wherein said superimposed current is sinusoidal and has a frequency in a range of 100 to 500 Hz.

* * * * *